(12) United States Patent
Uehara et al.

(10) Patent No.: US 7,083,283 B2
(45) Date of Patent: Aug. 1, 2006

(54) PROJECTOR

(75) Inventors: Katsuyuki Uehara, Misato-mura (JP);
Kazuhiro Nishida, Matsumoto (JP);
Hirtaka Yanagisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 15 days.

(21) Appl. No.: 10/895,339

(22) Filed: Jul. 21, 2004

(65) Prior Publication Data
US 2005/0078278 A1    Apr. 14, 2005

(30) Foreign Application Priority Data
Jul. 22, 2003   (JP)   ............... 2003-199921

(51) Int. Cl.
*G03B 21/14* (2006.01)
(52) U.S. Cl. .................. 353/20; 353/122; 359/495
(58) Field of Classification Search .................. 353/20, 353/31, 33, 34, 37; 349/5, 7, 8, 9, 18; 359/494, 359/495, 497, 500, 501
See application file for complete search history.

(56) References Cited

U.S. PATENT DOCUMENTS

| | | | | |
|---|---|---|---|---|
| 5,369,266 A | * | 11/1994 | Nohda et al. ............. | 250/208.1 |
| 5,659,411 A | * | 8/1997 | Nito et al. ................. | 349/117 |
| 5,727,860 A | * | 3/1998 | Broer et al. ............... | 353/20 |
| 5,842,762 A | * | 12/1998 | Clarke ....................... | 353/122 |
| 6,184,969 B1 | * | 2/2001 | Fergason ................... | 349/196 |
| 6,407,726 B1 | * | 6/2002 | Endo et al. ................ | 345/87 |
| 6,535,194 B1 | * | 3/2003 | Hanano et al. ............ | 345/101 |
| 6,888,582 B1 | * | 5/2005 | Tominaga et al. ........ | 349/5 |
| 6,972,809 B1 | * | 12/2005 | Nakanishi .................. | 349/5 |

FOREIGN PATENT DOCUMENTS

| | | |
|---|---|---|
| JP | A 7-36054 | 2/1995 |
| JP | A 07-064048 | 3/1995 |
| JP | A 10-083030 | 3/1998 |
| JP | A 2000-241897 | 9/2000 |
| JP | A 2001-209133 | 8/2001 |

* cited by examiner

*Primary Examiner*—William C. Dowling
(74) *Attorney, Agent, or Firm*—Oliff & Berridge, PLC

(57) ABSTRACT

Aspects of the invention can provide a projector capable of forming a projected image with an apparently seamless and smooth image quality in the stable state. As for the image light passed through a first unit, the polarization direction thereof can be appropriately rotated by a $\lambda/2$ phase plate, and a part of the image light can be split in the Y direction by a birefringent plate. When this is projected as it is, an image composed of a plurality of two dimensionally arranged pixels, pixels corresponding to the split image, and a black matrix area can be formed on a screen. As for the image light passed through a second unit, the polarization direction thereof can be appropriately rotated by a $\lambda/2$ phase plate, and a part of the image light can be split in the Y direction by a birefringent plate. Then, an image composed of the pixels in the previous stages, the pixels corresponding to the split images, and the black matrix area can be formed on the screen.

13 Claims, 11 Drawing Sheets

Incidence: S-polarized light (optical path R, G, or B)

Incidence: S-polarized light (optical path R or B)

Incidence: P-polarized light (optical path G)

PROJECTOR

BACKGROUND OF THE INVENTION

1. Field of Invention

Aspects of the invention can relate to a projector for projecting an image using a liquid crystal display panel, and other display units.

2. Description of Related Art

In related art projectors having a display element composed of discrete pixels, there are some projectors which incorporate an optical unit configured such that a plurality of wobbling elements each having a switch type phase modulation optical element which are optically transparent, and composed of a ferroelectric liquid crystal, and the like, and an optically transparent birefringent medium are stacked one on another. See, for example, JP-A-7-36054.

With such a projector, the operation of the phase modulation optical element can be switched during one frame, thereby to alternately switch the polarization direction of the light passing through the birefringent optical element to the orthogonal direction. As a result, the optical path of the light emitted through the phase modulation optical element and the birefringent medium is switched during one frame. This allows the gap between pixels to be filled in. As a result, it is possible to project the image of the display element composed of discrete pixels as a seamless continuous image.

However, with the foregoing related art projector, the phase modulation optical element is switched during one frame period to be driven. Therefore, it is not easy to ensure the stable operation of the phase modulation optical element. As a result, the phase modulation optical element or the driving circuit itself can become costly, or the resulting image tends to be instable.

Further, with the foregoing related art projector, the transmittance reduction to a certain degree or more cannot be avoided, nor the occurrence of the nonuniform transmittance cannot be avoided, either. Accordingly, the reduction of luminance and the nonuniform luminance of the projected image inevitably occur.

SUMMARY OF THE INVENTION

Aspects of the invention can provide a projector capable of forming a projected image with an apparently seamless smooth image quality in the stable state. Further, the invention can provide a projector capable of forming a projected image with less luminance reduction and nonuniform luminance.

The exemplary projector in accordance with the invention can include a projection optical system for imaging an image light from a display unit, a birefringent light splitting element arranged with the reference direction set to a prescribed direction with respect to the center axis of the incident luminous flux, and a polarization state adjusting member for adjusting the polarization state of the image light to be made incident upon the birefringent light splitting element as to the distribution between a component in the prescribed direction and a component in the direction orthogonal to the prescribed direction. Incidentally, the polarization state adjusting member can be generally placed on the rear side of the projection optical system (i.e., on the display unit side of the projection optical system, in other words, on the optical path from the display unit till the projection optical system). However, the polarization state adjusting member may also be placed in the projection optical system, or on the optical path from the projection optical system till a screen. In this case, the image light is desirably a parallel light from the viewpoints of the image quality, and the like. However, even if the image light is not a parallel light at that section, the intended imaging characteristics and the like can be obtained by the optical design allowing for the state of the finally projected image.

With the projector, the polarization state adjusting member can adjust the polarization state of the image light to be made incident upon the birefringent light splitting element as to the distribution between a component in the prescribed direction and a component in the direction orthogonal to the prescribed direction. Therefore, it is possible to adjust the intensity ratio in which the image light is split by the birefringent light splitting element, relatively precisely according to the distribution. As a result, splitting of the image light by the birefringent light splitting element can be invariably kept in a desired intensity ratio (e.g., 1:1). This can eliminate the necessity of switching the state of the polarization state adjusting member for splitting of the image light. As a result, it is possible to hold the split state of the image light with stability by a simple method. In other words, even when the display unit has discrete pixels separated by a black matrix or the like, by setting of the characteristics of the polarization state adjusting member and the birefringent light splitting element, not only it is possible to cause such pixel shift as to fill in the gap between the pixels, but also it is possible to project a seamless, or apparently seamless continuous smooth image in the stable state, and it is possible to form a projected image with less luminance reduction and nonuniform luminance.

Further, in a projector in accordance with an exemplary embodiment of the invention, the polarization state adjusting member can include at least one of a wave plate and an optically rotating element. In this case, it is possible to stabilize the polarization state of the image light to be made incident upon the birefringent light splitting element with simplicity. This enables the simple formation of a stable projected image with less luminance reduction and nonuniform luminance. Incidentally, the term optically rotating element denotes the concept including an optical device such as a Faraday rotator.

Still further, in accordance with another exemplary embodiment of the invention, the polarization state adjusting member has a wave plate, and adjusts the polarization state of the image light by rotating the reference direction of the wave plate about the center axis. In this case, it is possible to adjust the polarization state of the image light to be incident upon the birefringent light splitting element to the desired state by the simple operation of setting of the rotational position of the wave plate.

Furthermore, in accordance with another exemplary embodiment of the invention, the display unit is a light modulating unit to be illuminated by an illumination light from an illumination unit, the light modulating unit can include a black matrix portion for restricting the emission of the image light by the periodic partial region, and the birefringent light splitting element is a birefringent plate having a thickness corresponding to the arrangement and the shape of the black matrix portion along the central axis. In this case, the image formed by a non-light emitting type light modulating unit can be projected on a screen or the like. By setting of the refractive index characteristics, dimensions, and the like of the birefringent light splitting element, the interpolation by the respective split image lights is made proper. As a result, the black matrix portion provided in the light modulating unit becomes inconspicuous.

Furthermore, in accordance with a further exemplary embodiment of the invention, the polarization state adjusting member is capable of changing the polarization state of the image light to be made incident upon the birefringent light splitting element, and thereby changing the intensity ratio in which the image light to be split by the birefringent light splitting element. In this case, it is possible to change the intensity ratio in which the image light is split by the birefringent light splitting element according to the circumstances. This enables the resolution and the like of the projected image to be set in the desirable state. Specifically, it is possible to vary the feeling of roughness of the image caused by, for example, the black matrix to a given degree.

Still further, in accordance with a furthermore specific embodiment of the invention, the projector further includes a control means for driving the polarization state adjusting member, and thereby changing the intensity ratio in which the image light is split by the birefringent light splitting element. In this case, it is possible to automatically set the projected image in a proper state according to the type (such as analog type or digital type) of the signal to be inputted to the projector, a given operation such as image quality adjustment by a user, the characteristics (such as polarization and color) of the light to be emitted from the display unit, and the like.

Further, in accordance with a still further embodiment of the invention, the projector further includes: a second birefringent light splitting element arranged on the front side of the birefringent light splitting element with the reference direction set to the direction orthogonal about the optical axis to the prescribed direction; and a second polarization state adjusting member for adjusting the polarization state of the image light to be made incident upon the second birefringent light splitting element as to the distribution between a component in the prescribed direction and a component in the orthogonal direction. Herein, the wording "on the front side of the birefringent light splitting element" denotes "on the projection optical system side of the birefringent light splitting element", in other words, "on the optical path of the image light from the birefringent light splitting element till the projection optical system". In this case, the birefringent light splitting element (i.e., the first birefringent light splitting element) is capable of causing a given projection position shift in a prescribed direction. Whereas, also in the orthogonal direction thereto, the second birefringent light splitting element is capable of causing a given projection position shift. Therefore, it is possible to achieve a uniformly smooth image in such a state that the roughness of the image caused by the black matrix or the like is not present in any direction by the two dimensional pixel shift.

Moreover, in accordance with a still other exemplary embodiment of the invention, the display unit can include a plurality of light modulating units provided one for each color, and to be individually illuminated. The projector can further include a light synthesizing member for synthesizing and emitting the lights modulated by the plurality of the light modulating units. In this case, even when the light modulating units provided one for each color have discrete pixels, by appropriately operating the polarization state adjusting member and the birefringent light splitting element, and thereby filling in the gap between the pixels, it is possible to project a continuous color image without or with inconspicuous seams between the pixels in the stable state.

Further, in accordance with a further exemplary embodiment of the invention, the polarization state adjusting member and the birefringent light splitting element are sequentially arranged along the optical path on the front side of the light synthesizing member. In this case, the wording on the front side of the light synthesizing member denotes on the projection optical system side of the light synthesizing member, in other words, on the optical path of the image light from the light synthesizing member till the projection optical system. In this case, by respectively providing only one polarization state adjusting member and one birefringent light splitting element, it is possible to project a continuous color image without or with inconspicuous seams between the pixels in the stable state.

Still further, in accordance with a still more other exemplary embodiment of the invention, the polarization state adjusting members and the birefringent light splitting elements are respectively sequentially arranged along the optical paths for respective colors on the front side of a plurality of light modulating units and on the rear side of the light synthesizing member. Herein, the wording on the front side of the light modulating units denotes on the light synthesizing member side of the light modulating units. Whereas, the wording on the rear side of the light synthesizing member denotes on the light modulating unit side of the light synthesizing member. Resultantly, the polarization state adjusting members, and the like are each placed on the optical path of the image light from the light modulating unit to the light synthesizing member. In this case, the degree of elimination of the seams between the pixels can be adjusted individually for each color. This allows the various expression of a color image by the projector.

BRIEF DESCRIPTION OF THE DRAWINGS

The invention will be described with reference to the accompanying drawings, wherein like numerals reference like elements, and wherein:

FIG. 2B is a perspective view showing a configuration of a portion of the liquid crystal light valve, and the like;

FIGS. 7A to 7C are diagrams for showing modified examples of the operations shown in FIGS. 4A and 4B, and the like;

DETAILED DESCRIPTION OF PREFERRED EMBODIMENTS

Below, the configuration of a projector in accordance with a first exemplary embodiment of the invention will be described by reference to the accompanying drawings.

Figure 1:
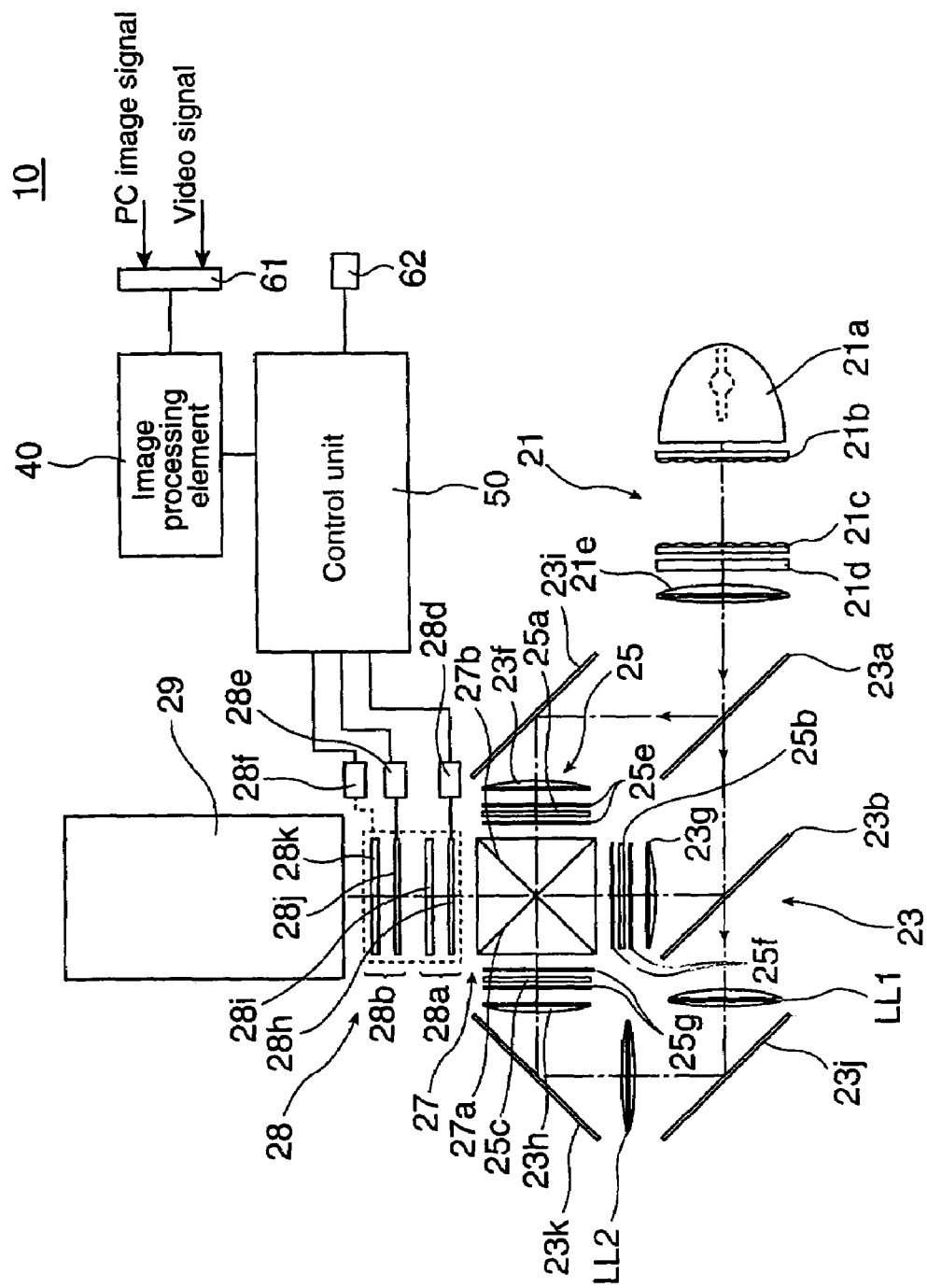
FIG. 1 is a diagram for illustrating an optical system of a projector of a first exemplary embodiment.

FIG. 1 is a diagram for illustrating the optical system of the projector of the first exemplary embodiment. The projector 10 has a light source unit 21 for generating a source light, a light splitting optical system 23 for splitting the source light from the light source unit 21 into three colors of R, G, and B, a light modulating element 25 to be illuminated by illumination lights of respective colors emitted from the light splitting optical system 23, a light synthesizing optical system 27 for synthesizing image lights of respective colors from the light modulating element 25, a BM removing unit 28 for performing a kind of an optical low-pass filtering processing on the image light synthesized by the light synthesizing optical system 27, and a projection lens 29, which is a projection optical system, for projecting the image light passed through the BM removing unit 28 onto a screen (not shown). Further, the projector 10 includes an image processing element 40 for generating driving signals for display units of respective colors (described in details later) incorporated in the light modulating element 25, and a control unit 50 for controlling the whole apparatus in centralized manner by appropriately operating the foregoing light source unit 21, BM removing unit 28, image processing element 40, and the like.

The light source unit 21 has a light source lamp 21a, a pair of fly-eye optical systems 21b and 21c, a polarized light converting member 21d, and a superimposing lens 21e. Herein, the light source lamp 21a is composed of, for example, a high pressure mercury lamp, and includes a concave mirror for collimating the source light. Whereas, a pair of the fly-eye optical systems 21b and 21c are composed of a plurality of element lenses arranged in a matrix. The source light from the light source lamp 21a is separated by these element lenses, and individual light beams are converged/diverged. The polarized light converting member 21d converts the source light emitted from the fly eye 21c into only a P-polarized light component parallel to the paper plane of FIG. 1, and supplies it to the optical system of the subsequent stage. The superimposing lens 21e appropriately converges the illumination light passed through the polarized light converting member 21d as a whole, which enables the superimposed illumination of display units of respective colors. In other words, the illumination light passed through both the fly-eye optical systems 21b and 21c, and the superimposing lens 21e passes through the light splitting optical system 23 described in details below, and uniformly and superimposedly illuminates the display units of respective colors, i.e., liquid crystal light valves 25a to 25c of respective colors provided in the light modulating element 25.

The light splitting optical system 23 has first and second dichroic mirrors 23a and 23b, three field lenses 23f to 23h, and reflection mirrors 23i, 23j, and 23k, and configures the illumination unit with the light source unit 21. The first dichroic mirror 23a reflects R light out of the three colors of R, G, and B, and transmits G light and B light. Whereas, the second dichroic mirror 23b reflects G light out of the two colors of G and B, and transmits B light. The R light reflected by the first dichroic mirror 23a in the light splitting optical system 23 can be made incident upon the field lens 23f for adjusting the angle of incidence through the reflection mirror 23i. The G light passed through the first dichroic mirror 23a, and reflected by the second dichroic mirror 23b is also made incident upon the similar field lens 23g. Further, the B light passed through the second dichroic mirror 23b is made incident upon the field lens 23h for adjusting the angle of incidence through relay lenses LL1 and LL2, and the reflection mirrors 23j and 23k.

The light modulating element 25 has three liquid crystal light valves 25a to 25c, each of which is a modulation unit or a light modulating unit, and three pairs of polarizing filters 25e to 25g arranged so as to respectively interpose their corresponding liquid crystal light valves 25a to 25. The R light reflected by the first dichroic mirror 23a is made incident upon the plate-like liquid crystal light valve 25a through the field lens 23f. The G light passed through the first dichroic mirror 23a, and reflected by the second dichroic mirror 23b is made incident upon the plate-like liquid crystal light valve 25b through the field lens 23g. The B light passed through both the first and second dichroic mirrors 23a and 23b is made incident upon the plate-like liquid crystal light valve 25c through the field lens 23h. The respective liquid crystal light valves 25a to 25c are optical modulation type display units for modulating the spatial intensity distribution of the incident illumination light by the rotation of the polarization direction. The lights of three colors (P-polarized lights in the case shown) respectively incident upon the respective liquid crystal light valves 25a to 25c are modulated in response to the driving signal or the image signal inputted as an electric signal in the respective liquid crystal light valves 25a to 25c. In this step, the polarization directions of the illumination lights incident upon the respective liquid crystal light valves 25a to 25c are adjusted with precision by the polarizing filters 25e to 25g. In addition, the modulated lights of prescribed polarization directions (S-polarized lights in the shown case) are extracted from the modulated lights emitted from the respective liquid crystal light valves 25a to 25c.

Figure 2A:
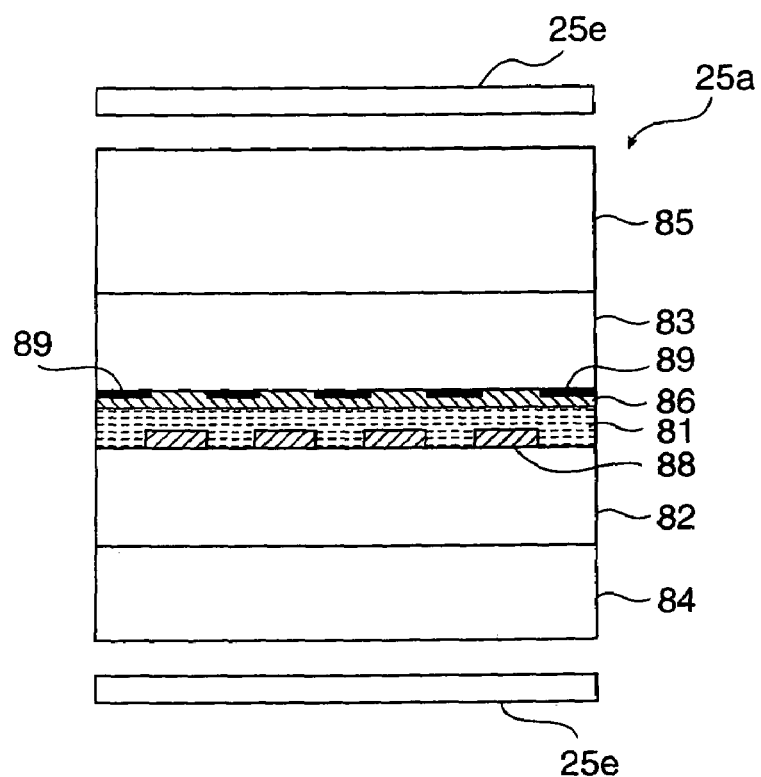
FIG. 2A is a cross sectional view showing a configuration of a liquid crystal light valve.
Figure 2B:
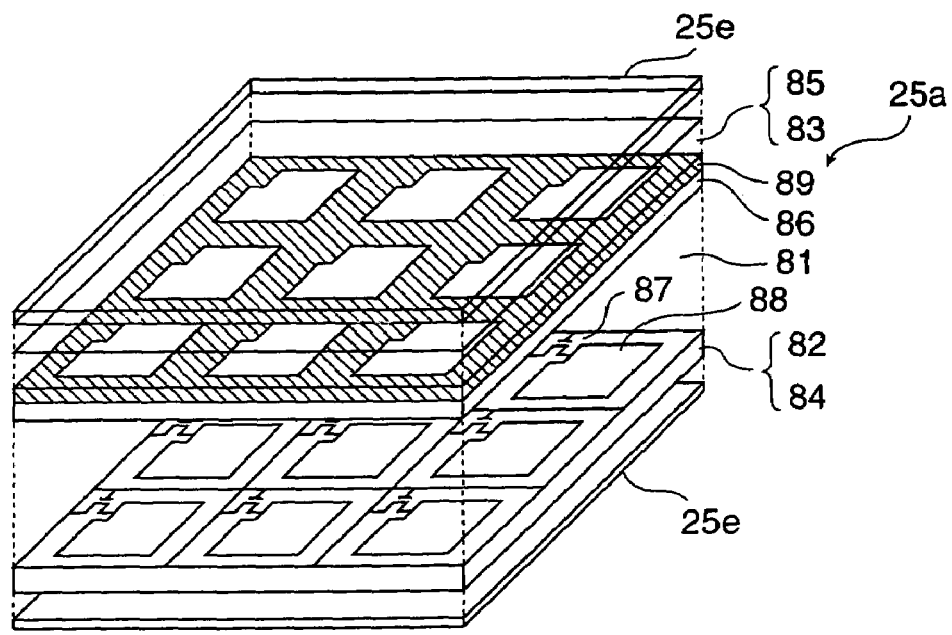

FIG. 2A is a schematic cross-sectional view for mainly showing the configuration of the liquid crystal light valve 25a. FIG. 2B is a schematic perspective view showing the configuration of a portion of the liquid crystal light valve 25a, and the like. The liquid crystal light valve 25a has a transparent outgoing-side substrate 82 and a transparent incident-side substrate 83 with a liquid crystal layer 81 interposed therebetween. It further has an outgoing-side cover 84 and an incident-side cover 85 each bonded on its corresponding outer side thereof by an optical adhesive. A transparent common electrode 86 is provided on the surface of the incident-side substrate 83 on the side of the liquid crystal layer 81.

On the other hand, on the surface of the outgoing-side substrate 82 on the side of the liquid crystal layer 81, a thin film transistor 87 and transparent pixel electrodes 88 are provided. The thin film transistor 87 is provided in the periphery of a plurality of the pixel electrodes 88 arranged in a matrix, and electrically connected to the pixel electrodes 88. Each pixel is composed of one pixel electrode 88, the common electrode 86, and the liquid crystal layer 81 interposed therebetween. Between the incident-side substrate 83 and the common electrode 86, a lattice black matrix (light-shielding region) 89 is provided in such a manner as to separate the respective pixels one from another. The black matrix 89 has a function of cutting of the incidence of light upon the thin film transistor and wiring, but eventually forms the lattice dark portion extending between the pixels, causing the roughness of an image. The countermeasure thereagainst will be described below. The outgoing-side substrate 82 and the incident-side substrate 83 each further have an alignment film for aligning the liquid crystal molecules forming the liquid crystal layer 81 (not shown). The liquid crystal light valve 25a having the foregoing configuration is referred to as an active matrix type liquid crystal device. Incidentally, the liquid crystal light valve 25a of this exemplary embodiment is a TN mode liquid crystal device, wherein the alignment film are formed so that the alignment direction of the liquid crystal molecules on the side of the outgoing-side substrate 82 and the alignment direction of the liquid crystal molecules on the side of the incident-side substrate 83 form an angle of about 90 degrees.

The incident-side cover 85 and the outgoing-side cover 84 are provided for displacing the position of the surface of the liquid crystal light valve 25a from the back focus position of the projection lens 29 shown in FIG. 1, and thereby making the dust deposited on the surface of the liquid crystal light valve 25a inconspicuous on the projected image. In this exemplary embodiment, the covers 85 and 84 are bonded on the incident-side substrate 83 and the outgoing-side substrate 82, respectively. However, instead, it is also possible to impart such a function to the substrates 83 and 82 themselves by increasing the thicknesses of the substrates 83 and 82 themselves. Whereas, these covers 85 and 84 do not exert an effect on the function of the modulation. Therefore, they may be omitted, alternatively, only one of them may be provided.

Incidentally, for example, a microlens array may be arranged between the incident-side substrate 83 and the incident-side cover 85. Such a microlens array has a plurality of microlenses for individually condensing light onto their respective pixels, and it can improve the use efficiency of the light.

Whereas, in FIGS. 2A and 2B, the arrangement of the black matrix 89 is schematically shown. In actuality, the black matrix 89 may be formed as a light-shielding film on either one of the outgoing-side substrate 82 and the incident-side substrate 83. Alternatively, it may be formed in combination with the light-shielding films provided on their respective substrates 82 and 83.

Up to this point, a description was given to the configuration of the liquid crystal light valve 25a for R light. However, it should be understood that the liquid crystal light valves 25b and 25c of the other colors each also have the same configuration, and hence a description thereon will be omitted.

Returning to FIG. 1, a cross dichroic prism 27 is a light synthesizing member, and includes therein a dielectric multilayer film 27a for reflecting R light and a dielectric multilayer film 27b for reflecting B light in orthogonal relation to each other. It reflects the R light from the liquid crystal light valve 25a at the dielectric multilayer film 27a, and allows the reflected light to be emitted to the right-hand side of the direction of travel. It allows the G light from the liquid crystal light valve 25b to be emitted and travel in a straight line through the dielectric multilayer films 27a and 27b. Whereas, it reflects the B light from the liquid crystal light valve 25c at the dielectric multilayer film 27b, and allows the reflected light to be emitted to the left-hand side of the direction of travel. The synthesized light thus synthesized at the cross dichroic prism 27 is made incident upon the projection lens 29 through the BM removing unit 28.

The BM removing unit 28 has first and second units 28a and 28b each capable of implementing a kind of optical low-pass filtering processing on an image light, and actuators 28d to 28f for appropriately rotating the members in the respective units 28a and 28b, and the whole of both the units 28a and 28b around the optical axis, and appropriately operating both the units 28a and 28b. Herein, the first unit 28a has a $\lambda/2$ phase plate 28h for rotating the polarization direction of the image light in a desired amount, and a birefringent plate 28i for splitting the optical path of the image light by the birefringence effect. Similarly, the second unit 28b also has a $\lambda/2$ phase plate 28j for rotating the polarization direction of the image light in a desired amount, and a birefringent plate 28k for splitting the optical path of the image light by the birefringence effect. Herein, the respective $\lambda/2$ phase plates 28h and 28j function as polarization state adjusting members each for adjusting the polarization state of the image light, i.e., the direction of the plane of polarization by setting of the rotational position of itself. The respective birefringent plates 28i and 28k function as birefringent light splitting elements each for splitting the image light in the corresponding direction in accordance with the polarization state of the image light, and causing such image shift as to fill in the gap between the pixels. These birefringent plates 28i and 28k are manufactured by processing a material, such as rock crystal, lithium niobate, calcite, or sapphire. It causes the optical path shift, i.e., the optical path splitting between the ordinary light component and the extraordinary light component of the incident light. Whereas, the actuators 28d to 28f function as control means for changing, to the target value, the intensity ratio in which the image light is split for pixel shift in the BM removing unit 28, together with the control unit 50.

Figure 3A:
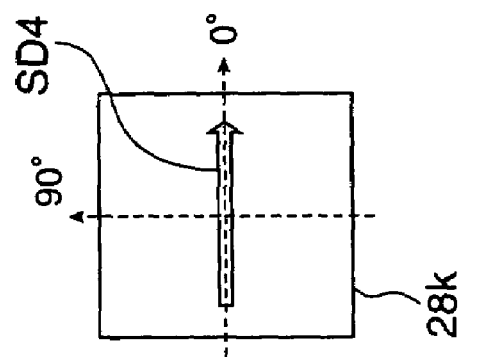
FIGS. 3A to 3D are diagrams for illustrating the arrangement of optical elements constituting the essential portion of the apparatus.
Figure 3B:
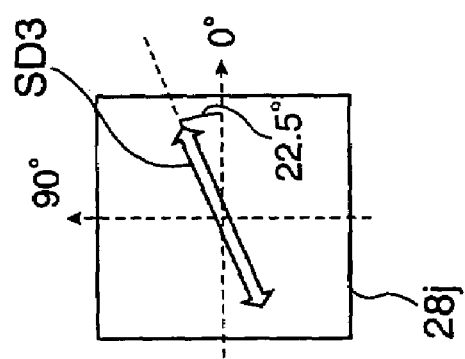
Figure 3C:
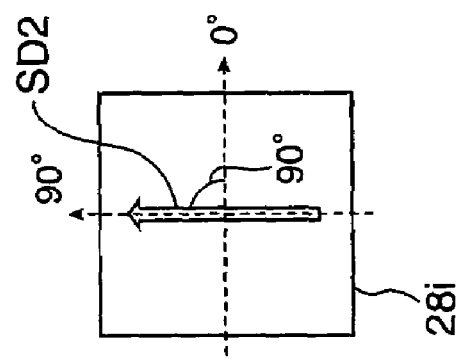
Figure 3D:
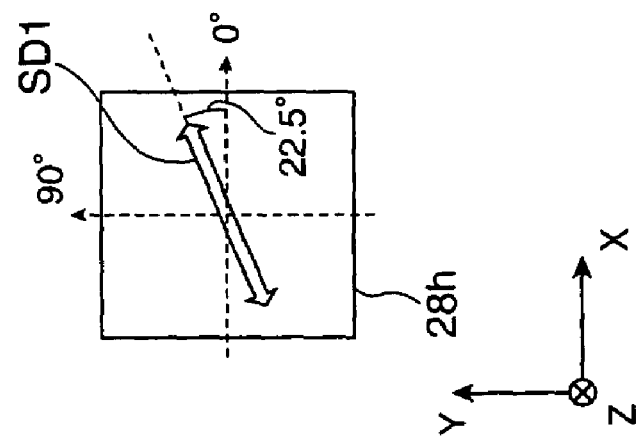

FIGS. 3A to 3D are diagrams for illustrating the layout of the $\lambda/2$ phase plates 28h and 28j, and the birefringent plates 28i and 28k. In FIGS. 3A to 3D, the Z direction perpendicular to the paper plane is the optical axis direction of the projector 10 of FIG. 1. (i.e., the direction of the center axis of the incident luminous flux which is an image light); the X direction corresponds to the transverse direction of the projected image; and the Y direction corresponds to the longitudinal direction of the projected image. The X, Y, and Z directions are perpendicular to one another. Out of these, FIG. 3A shows the reference direction SD1 of the $\lambda/2$ phase plate 28h, which corresponds to the optic axis. FIG. 3B shows the reference direction SD2 of the birefringent plate 28i, corresponding to the direction in which the optic axis is inclined with respect to the optical axis perpendicular to the paper plane. FIG. 3C shows the reference direction SD3 of the $\lambda/2$ phase plate 28j corresponding to the optic axis. FIG. 3D shows the reference direction SD4 of the birefringent plate 28k corresponding to the direction in which the optic axis is inclined with respect to the optical axis. As apparent from the diagrams, the reference directions SD1 and SD3 of both the $\lambda/2$ phase plates 28h and 28j each form an angle of 22.5° with respect to the horizontal direction of 0°, and can rotate the S-polarized light or the like emitted from the cross dichroic prism 27 by 45°, and can convert the light into a polarized light in an inclined state at 45°. Whereas, both the birefringent plates 28i and 28k have the reference directions SD2 and SD4 forming angles of 90° and 0° with respect to the horizontal direction of 0°, respectively. These can split off an extraordinary light in respective directions from the ordinary light traveling in a straight line along the optical axis.

Figures 4A, 4B:
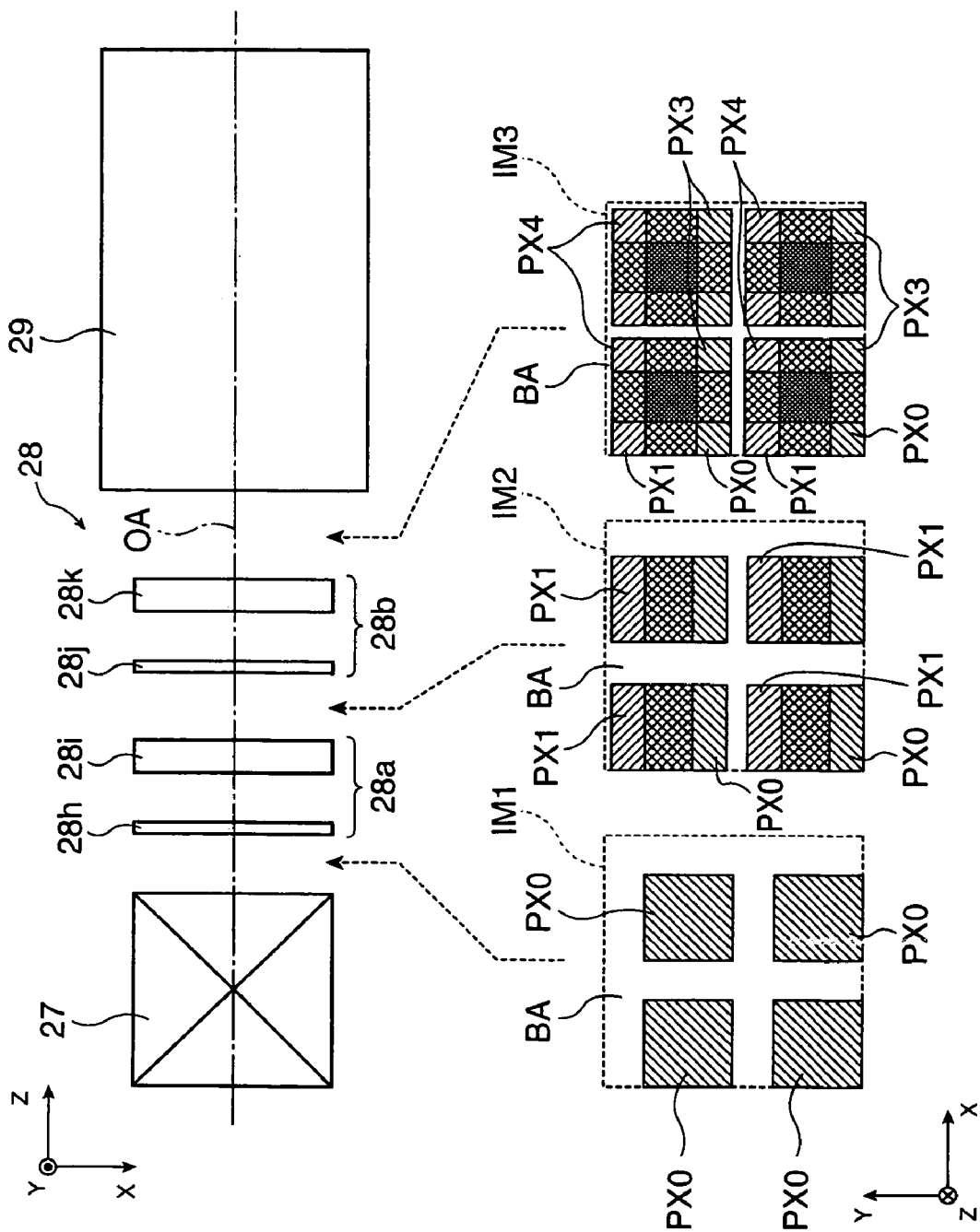
FIGS. 4A and 4B are diagrams for conceptually illustrating the function of a BM removing unit.

FIGS. 4A and 4B are diagrams for conceptually illustrating the function of the BM removing unit 28. FIG. 4A shows the positional relationship of the members in the BM removing unit 28. FIG. 4B is a diagram for illustrating the image processing in each position in the BM removing unit 28. The image light emitted from the cross dichroic prism 27 is the one obtained by synthesizing the R, G, and B lights from the respective liquid crystal light valves 25a to 25c (see, FIG. 1). When the image light is projected as it is, an image IM1 composed of a plurality of two dimensionally arranged pixels PX0, and a black matrix area BA formed in a lattice between the respective pixels PX0 is formed on a screen disposed on the front side of the projection lens 29. Whereas, for the image light passed through the first unit 28a, the polarization direction thereof has been appropriately rotated about the optical axis OA by the λ/2 phase plate 28h, and a part of the image light has been split in the upward, Y direction by the birefringent plate 28i. When this is projected as it is, an image IM2 composed of a plurality of the two dimensionally arranged pixels PX0, pixels PX1 corresponding to the split image, and the black matrix area BA is formed on the screen. Incidentally, the pixel PX1 formed of the split image is a pixel shift image formed by appropriately shifting the split image of the pixel X0 corresponding to the ordinary light in the Y direction (in the shown example, the shift amount of the split image is set to be about the width of the black matrix area BA, but it is not limited thereto, and it can be set to be equal to or smaller than the width of the black matrix area BA, or equal to, or larger than the width thereof).

As a result of such superposition, the width along the Y direction of the lattice of the black matrix area BA decreases. Further, for the image light passed through the second unit 28b, the polarization direction has been appropriately rotated about the optical axis OA by the λ/2 phase plate 28j, and a part of the image light has been split in the transverse, X direction by the birefringent plate 28k. As a result, an image IM3 composed of the pixels PX0 and PX1 in the previous stages, the pixels PX3 and PX4 corresponding to the split images thereof, and a narrow inconspicuous black matrix area BA is formed on the screen. Incidentally, the pixels PX3 and PX4 formed through the second unit 28b are the pixel shift images formed by shifting the split images of the pixels PX0 and PX1 in the X direction by about the same amount as with the first unit 28a. As a result of such superposition of the split lights, the width along the X direction out of the lattice lines of the black matrix area BA decreases. In other words, the black matrix area BA is roughly filled in by splitting in the two orthogonal directions of the initial pixel PX0. As a result, the lattice black matrix roughly disappears from the image finally projected on the screen by the projection lens 29. This can remove the feeling of roughness of the image.

Figure 5A:
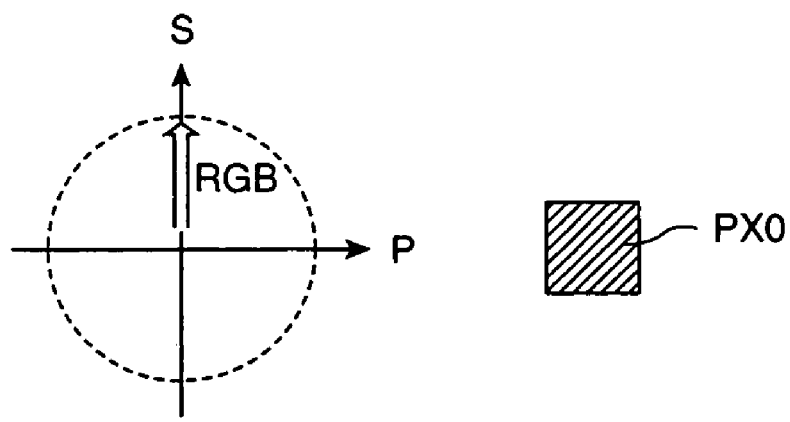
FIGS. 5A to 5C are diagrams for specifically illustrating the function of a first unit.
Figure 5B:
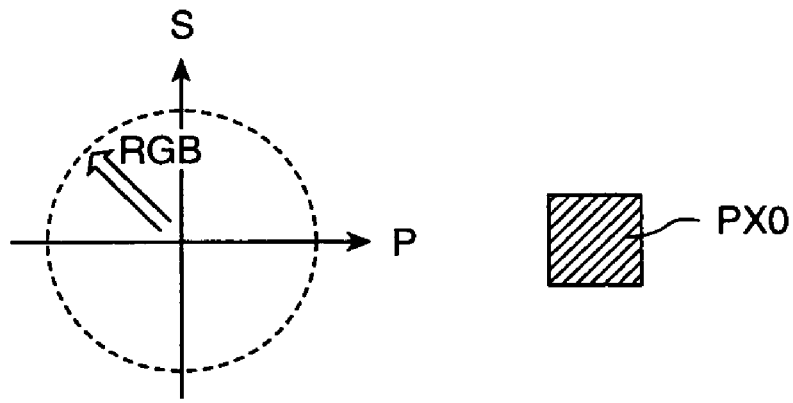
Figure 5C:
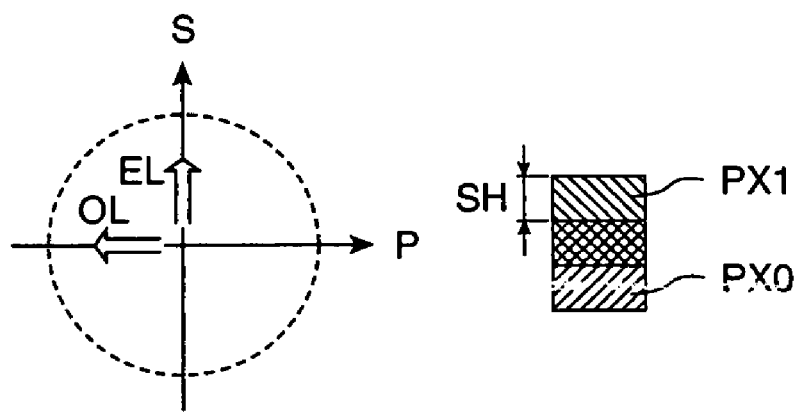

FIGS. 5A to 5C are diagrams for specifically illustrating the function of the first unit 28a at the previous stage in the BM removing unit 28. As shown in FIG. 5A, the image light before being made incident upon the BM removing unit 28 is composed of R light, G light, and B light each in the S-polarized state. As shown in FIG. 5B, the respective color lights of R light, G light, and B light are made incident upon the first λ/2 phase plate 28h, and thereby each rotated in plane of polarization by 45°. Further, as shown in FIG. 5C, by being made incident upon the birefringent plate 28i, each color light of R light, G light, and B light is spatially split into ordinary light OL and extraordinary light EL appropriately. This enables the projection of the initial pixel PX0, and the pixel PX1 of the split image formed by shifting it by the shift amount SH on a screen. In the foregoing process, the plane of polarization of each color light of R, G, and B has been rotated by 45° by the λ/2 phase plate 28h. As a result, it is possible to set the intensity ratio of the ordinary light and the extraordinary light, i.e., the intensity ratio of the respective brightnesses of the zero-order pixel PX0 and the split first-order pixel PX1 at roughly 1:1. Accordingly, by combining the adjustment of the intensity ratio of the split pixels PX0 and PX1 in this manner, and the adjustment of the shift amount SH of the image PX1 with respect to the pixel PX0 by setting the optical path length of the birefringent plate 28i at a desirable value, it is possible to efficiently interpolate the black matrix area BA, and to make it inconspicuous with reliability.

Figure 6:
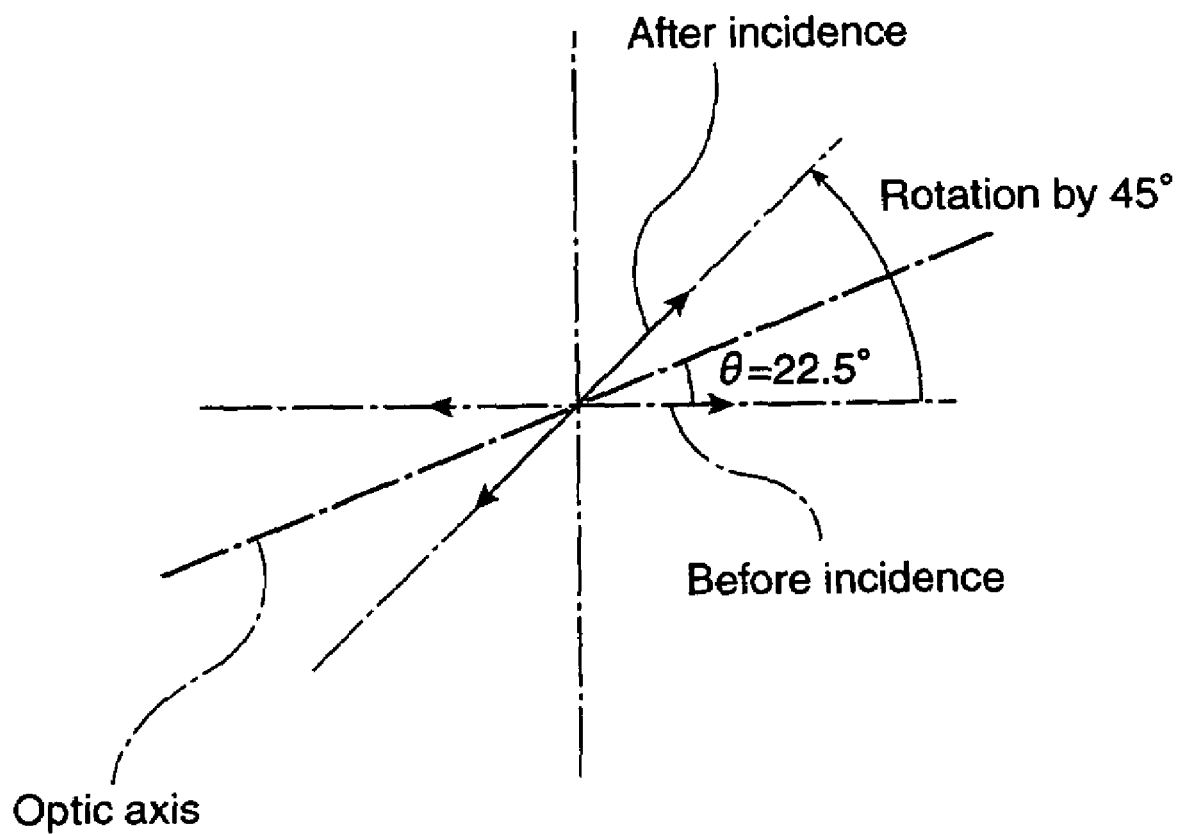
FIG. 6 is a diagram for specifically illustrating the function of a $\lambda/2$ phase plate.

FIG. 6 is a diagram for specifically illustrating the function of the λ/2 phase plate 28h. When the optic axis of the λ/2 phase plate 28h is inclined at an inclination angle θ=22.5° with respect to the direction of S-polarized light, the plane of polarization of the S-polarized light is rotated by 2θ=45°. Resultantly, both the S- and P-polarized light components are obtained. Incidentally, also when the λ/2 phase plate 28h is inclined at an inclination angle θ=112.5°, the S-polarized light can be rotated by 45°. As a result, it is possible to generate a P-polarized light component from the S-polarized light.

Returning to FIG. 1, the image processing element 40 outputs driving signals to the respective liquid crystal light valves 25a to 25c provided in the light modulating element 25. The image processing element 40 selectively receives digital image signals from a personal computer, and video image signals from a video reproduction device, or the like through a switching unit 61. The image processing element 40 judges the contents of the image signals, and generates the driving signals to be outputted to the respective liquid crystal light valves 25a to 25c. At this step, by appropriately operating the actuators 28d and 28e according to the contents of the image signal, i.e., whether the image signal is a digital image signal or a video image signal, it is possible to determine whether the black matrix area BA is eliminated or not, or to appropriately adjust the degree of elimination thereof.

For example, when a digital image signal is inputted, the black matrix area BA is left by the setting of the BM removing unit 28, and a clear image with high resolution is projected. On the other hand, when a video image signal is inputted, the black matrix area BA is eliminated by the setting of the BM removing unit 28, and a smooth image is projected while maintaining the high resolution. Whereas, when the black matrix area BA is eliminated, it is possible to adjust the degree of elimination thereof according to the kind of the image signal, and the kind of the image (e.g., whether it is the image in which white is dominant, or not; and whether the image is a slide-like image, or not). Specifically, the position of the optic axis of the λ/2 phase plate 28h, i.e., the angle of the optic axis with respect to the polarization direction of the incident luminous flux is appropriately changed within a range of, for example, 0° to 22.5°. This allows the plane of polarization of the image light to be set arbitrarily within the range of 0° to 45°. Accordingly, it is possible to arbitrarily set the intensity ratio of ordinary light and extraordinary light, i.e., the intensity ratio of the zero-order pixel PX0 and the first-order pixel PX1 within a range of 0 to 0.5.

Further, in the same manner, it is also possible to set the intensity ratio of the second-order pixels PX3 and PX4 to both the pixels PX0 and PX1 arbitrarily within a range of 0 to 0.5. In other words, the image composed of the original discrete pixel group is split in a given intensity ratio, and split images are mutually shifted by a distance equal to, or smaller than the pixel pitch. This allows the interpolation such that the black matrix present in the original image is eliminated to a desired degree. Incidentally, in the foregoing example, the intensity ratio of the ordinary light and the extraordinary light, i.e., the intensity ratio of the initial image and the split interpolated image is set according to the contents of the image signal. However, it is also possible to set the intensity ratio of the initial image and the split interpolated image utilizing a control panel 62 provided in the periphery of the projector 10. In this case, on a voluntary basis, a user can select either of (1) an image in which the black matrix area BA is left, but which is clear and has high resolution; and (2) an image which is smooth with high resolution kept, still with the black matrix area BA having been eliminated, or the intermediate image therebetween, and project it on a screen.

Below, a description will be given to the operation of the projector 10 in accordance with a first exemplary embodiment. The source light from the light source unit 21 undergoes color splitting by the first and second dichroic mirrors 23a and 23b provided in the light splitting optical system 23, and are made incident as illumination lights upon their corresponding liquid crystal light valves 25a to 25c, respectively. The respective liquid crystal light valves 25a to 25c are modulated by image signals from the outside, and have a two-dimensional refractive index distribution, and modulate their respective illumination lights in terms of two-dimensional space on a per pixel basis. The illumination lights, i.e., the image lights thus modulated at the respective liquid crystal light valves 25a to 25c are synthesized at the cross dichroic prism 27, and then the synthesized light is made incident upon the projection lens 29 through the BM removing unit 28. The image light made incident upon the projection lens 29 is projected on a screen not shown.

In this case, the BM removing unit 28 can be provided between the light synthesizing optical system 27 and the projection lens 29. Therefore, it is possible to eliminate the black matrix from the projected image along the longitudinal direction perpendicular to the paper plane of FIG. 1 and the transverse direction horizontal to the paper plane. If required, it is possible to adjust the degree of the elimination of the black matrix. In other words, it is possible to cause such pixel shift as to fill in the gap between the initial pixels PX0 according to the rotational positions of the $\lambda/2$ phase plates 28h and 28j and the setting of the characteristics of the birefringent plates 28i and 28k. As a result, it is possible to project a seamless or apparently seamless, continuous smooth image in the stable state. In addition, it is possible to inhibit the reduction of the luminance, or the occurrence of uneven luminance for projection.

Figure 7A:
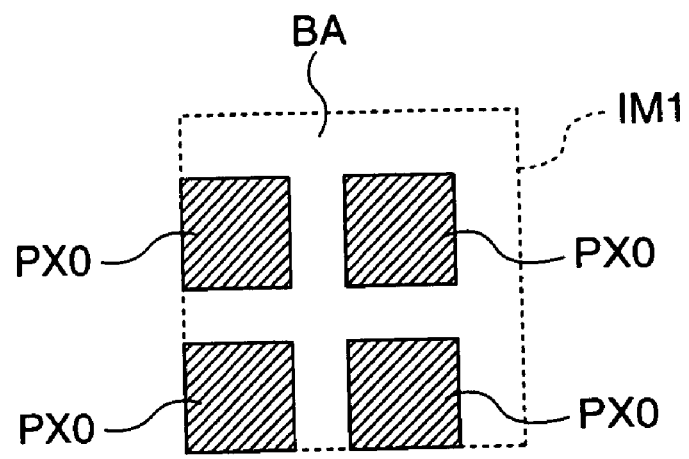
Figure 7B:
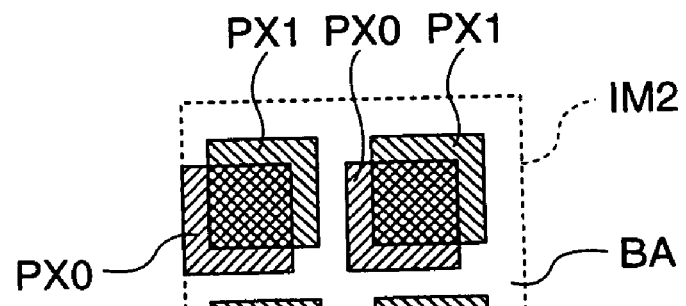
Figure 7C:
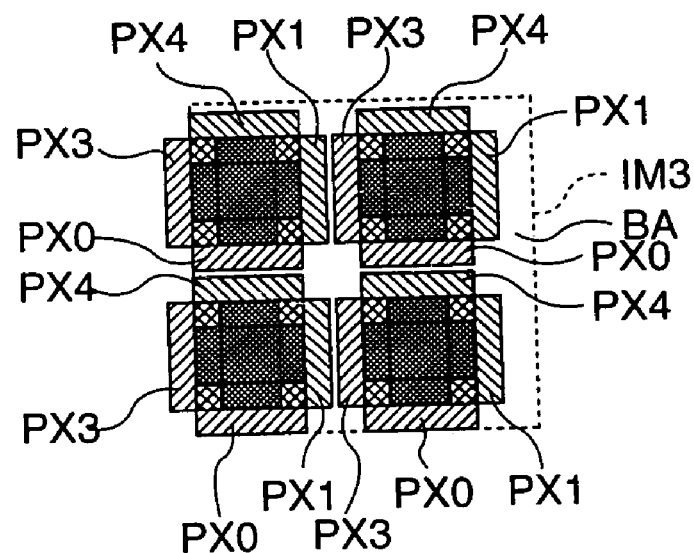

FIGS. 7A to 7C are diagrams for illustrating the modified examples of the operation shown in FIGS. 4A and 4B, and the like. In this case, the direction of elimination of the black matrix area BA can be appropriately changed by operating the actuator 28f (see, FIG. 1), or the like according to the contents of the image signal, and the like. Specifically, the actuator 28f is operated, thereby to rotate the BM removing unit 28 including the first and second units 28a and 28b as a whole by 45° about the optical axis. This results in that the split direction of the image for the pixel shift is not the X direction nor the Y direction, but the direction inclined at 45°. In this case, by appropriately operating the actuators 28d and 28e, it is possible to adjust the rotational positions of both the $\lambda/2$ phase plates 28h and 28j. Accordingly, it is possible to set the splitting intensity ratio of the image by both the birefringent plates 28i and 28k at a desirable value.

As shown in FIG. 7A, the image IM1 corresponding to the image light emitted from the cross dichroic prism 27 is composed of a plurality of two dimensionally arranged pixels PX0, and the black matrix area BA arranged between the respective pixels PX0. As shown in FIG. 7B, the image IM2 corresponding to the image light passed through the first unit 28a is composed of a plurality of two dimensionally arranged pixels PX0, the pixels PX1 corresponding to the split image in a direction oblique thereto, and the black matrix area BA. As shown in FIG. 7C, the image IM3 corresponding to the image light passed through the second unit 28b is composed of the pixels PX0 and PX1 in the previous stages, a pair of pixels PX3 and PX4 corresponding to the split images in a direction oblique thereto, and the black matrix area BA.

Figure 8:
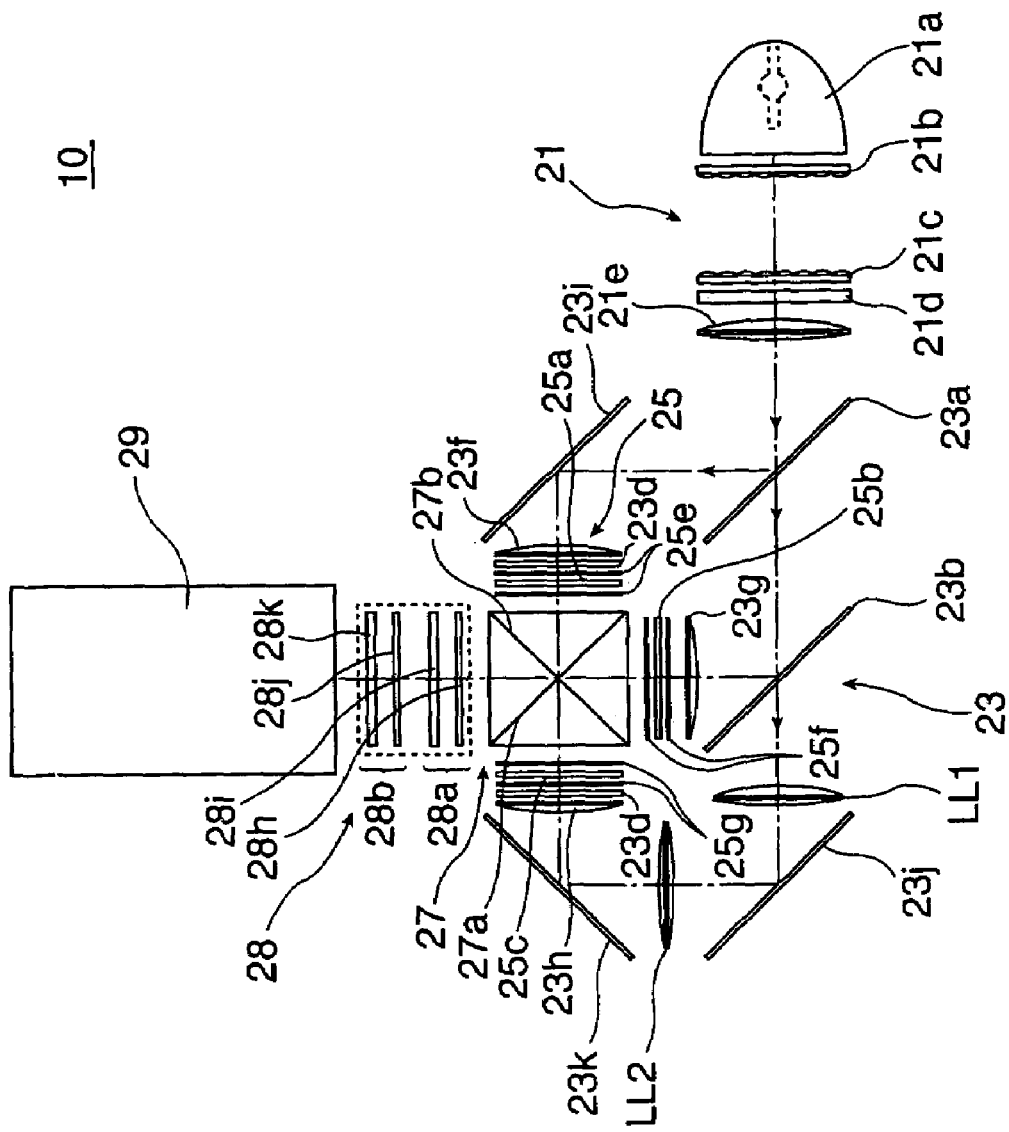
FIG. 8 is a diagram for illustrating a projector of a second exemplary embodiment.

FIG. 8 is a diagram for illustrating a projector of a second exemplary embodiment. The projector of the second exemplary embodiment is a modified form of the projector of the first exemplary embodiment. The same reference numerals and characters are given to the same elements, and the overlapped description thereof is omitted. Whereas, the elements or components not otherwise stated may be configured similarly as with the first exemplary embodiment.

In this case, the image lights emitted from the liquid crystal light valves 25a and 25c for R and B lights are set to be S-polarized lights oscillating in the direction perpendicular to the plane of incidence perpendicular to both the dielectric multilayer films 27a and 27b. Whereas, the image light emitted from the liquid crystal light valve 25b for G light is set to be a P-polarized light oscillating within the plane of incidence. For this reason, the source light extracted from the light source unit 21 is set to be an S-polarized light perpendicular to the paper plane. In addition, a $\lambda/2$ phase plate 23d for R light is placed between the field lens 23f and the liquid crystal light valve 25a. Whereas, a $\lambda/2$ phase plate 23d for B light is placed between the field lens 23h and the liquid crystal light valve 25c. As a result, the S-polarized R light reflected by the first dichroic mirror 23a is converted into a P-polarized light by the $\lambda/2$ phase plate 23d through the reflection mirror 23i and the field lens 23f. Then, only an S-polarized light component is extracted as a modulated light through the liquid crystal light valve 25a. Whereas, the S-polarized B light passed through the first and second dichroic mirrors 23a and 23b is converted to a P polarized light by the $\lambda/2$ phase plate 23d through relay lenses LL1 and LL2, the reflection mirrors 23j and 23k, and the field lens 23h. Then, only the S-polarized light component is extracted as a modulated light through the liquid crystal light valve 25c. Incidentally, the S-polarized G light reflected by the second dichroic mirror 23b passes as it is through the field lens 23g and the liquid crystal light valve 25b. Then, only the P-polarized light component is extracted as a modulated light.

With the foregoing configuration, the S-polarized lights from the respective liquid crystal light valves 25a and 25c for R and B lights are reflected by both the dielectric multilayer films 27a and 27b. Whereas, the P-polarized light from the liquid crystal light valve 25b for G light is transmitted through both the dielectric multilayer films 27a and 27b. As a result of this, even when the edge wavelengths in the transmission characteristics of both the dielectric multilayer films 27a and 27b are different for the S-polarized light and the P-polarized light, it is possible to enhance the transmission efficiency of G light by both the dielectric multilayer films 27a and 27b, while enhancing the reflection efficiency of R light and B light by both the dielectric multilayer films 27a and 27b.

In this case, however, the R and B lights incident upon the BM removing unit 28 through the cross dichroic prism 27 become S-polarized lights. Whereas, the G light incident upon the same BM removing unit 28 becomes a P-polarized light. Thus, the lights R and B, and G are different from each other in polarization direction. For this reason, each crystal axis direction of a pair of the $\lambda/2$ phase plates 28h and 28j provided in the removing unit 28 is appropriately set, thereby to rotate the plane of polarization of each color of R, G, and B by 45°. As a result, the intensity ratio of the ordinary light and the extraordinary light split at a pair of the birefringent plates 28i and 28k is set and fixed at roughly 1:1.

Figure 9A:
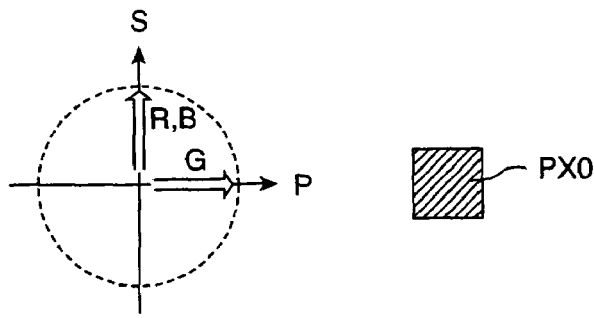
FIGS. 9A to 9D are diagrams for specifically illustrating the function of the first unit.
Figure 9B:
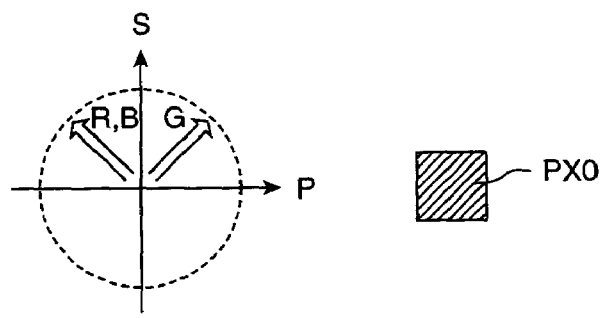
Figure 9C:
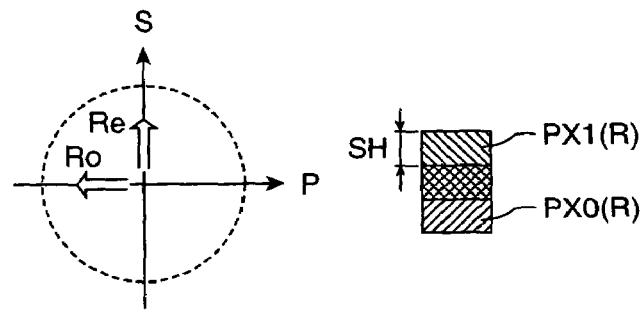
Figure 9D:
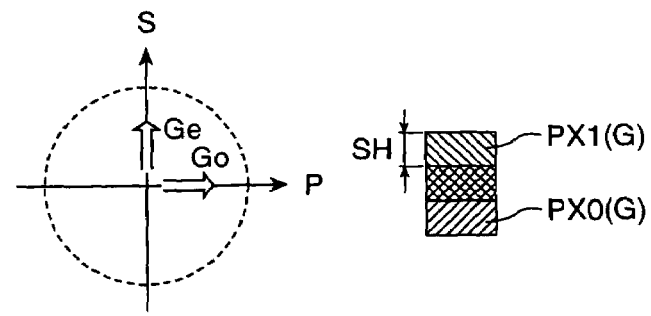

FIGS. 9A to 9D are diagrams each for specifically illustrating the role of the first unit 28a at the previous stage in the BM removing unit 28. As shown in FIG. 9A, the image light before being made incident upon the BM removing unit 28 is composed of S-polarized R and B lights, and P-polarized G light. As shown in FIG. 9B, by being made incident upon the first λ/2 phase plate 28h, both R and B lights and G light are rotated in plane of polarization by 45°. As shown in FIG. 9C, by being made incident upon the subsequent birefringent plate 28i, R light and B light are appropriately spatially split into ordinary light Ro and extraordinary light Re in an equal ratio. This enables the projection of the initial pixel PX0, and the pixel PX1 of the split image formed by shifting it by the shift amount SH on a screen at an equal intensity. On the other hand, as shown in FIG. 9D, by being made incident upon the birefringent plate 28i, G light is also appropriately spatially split into ordinary light Go and extraordinary light Ge in an equal ratio. This enables the projection of the initial pixel PX0, and the pixel PX1 of the split image formed by shifting it by the shift amount SH on the screen at an equal intensity. In other words, despite the fact that G light has a different plane of polarization from that of the R light and B light, it is possible to set the intensity ratio of ordinary light and extraordinary light, i.e., the intensity ratio of the respective brightnesses of the zero-order pixel PX0 and the split first-order pixel PX1 at roughly 1:1. Thus, it is possible to obtain the same pixel shift image for each color.

Figure 10A:
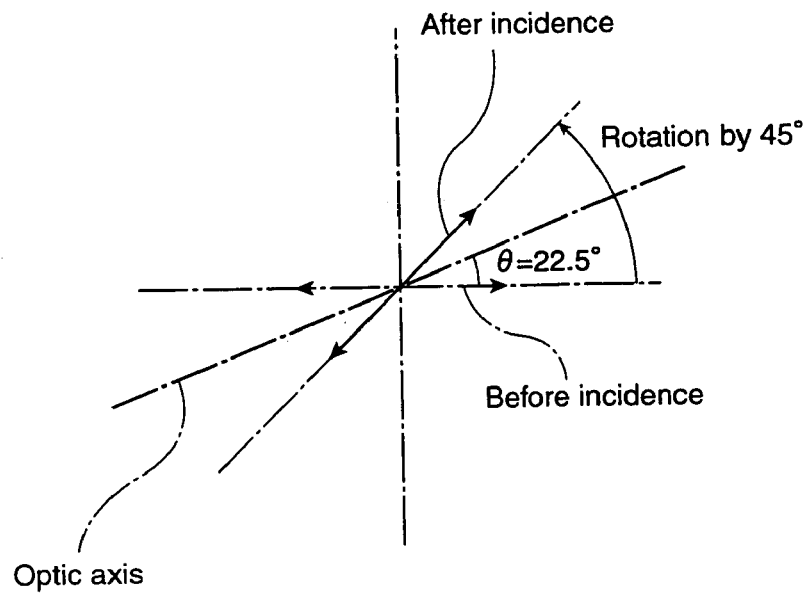
FIGS. 10A and 10B are diagrams for specifically illustrating the function of a $\lambda/2$ phase plate.
Figure 10B:
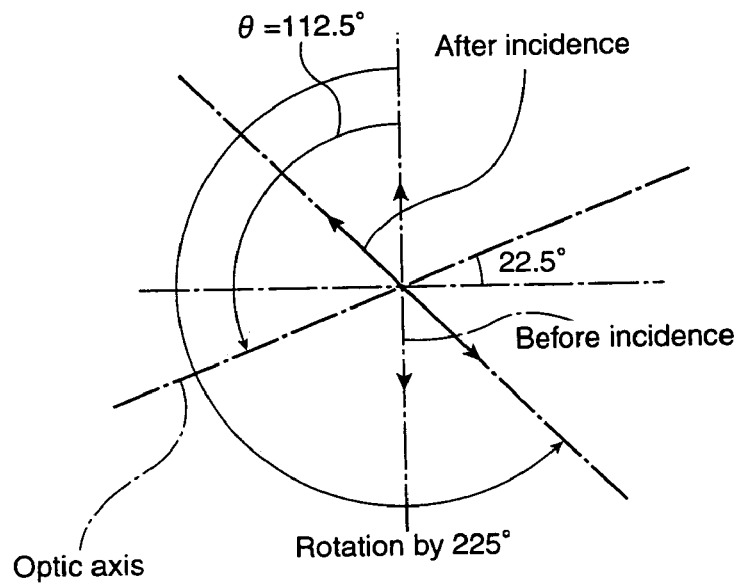

FIGS. 10A and 10B are diagrams for specifically illustrating the function of the λ/2 phase plate 28h in this exemplary embodiment. As shown in FIG. 10A, when R and B lights which are S-polarized lights are each made incident upon the λ/2 phase plate 28h with the inclination angle θ set to be equal to 22.5°, each plane of polarization of R and B lights is rotated by 2θ=45°, and both S- and P-polarized light components can be obtained evenly. Whereas, as shown in FIG. 10B, when G light which is a P-polarized light is made incident upon the λ/2 phase plate 28h with the inclination angle θ set to be equal to 67.5° with respect to the direction of the P-polarized light, the plane of polarization of the G light is rotated by 2θ=225° or 45°, and both S- and P-polarized light components can be obtained evenly.

Figure 11:
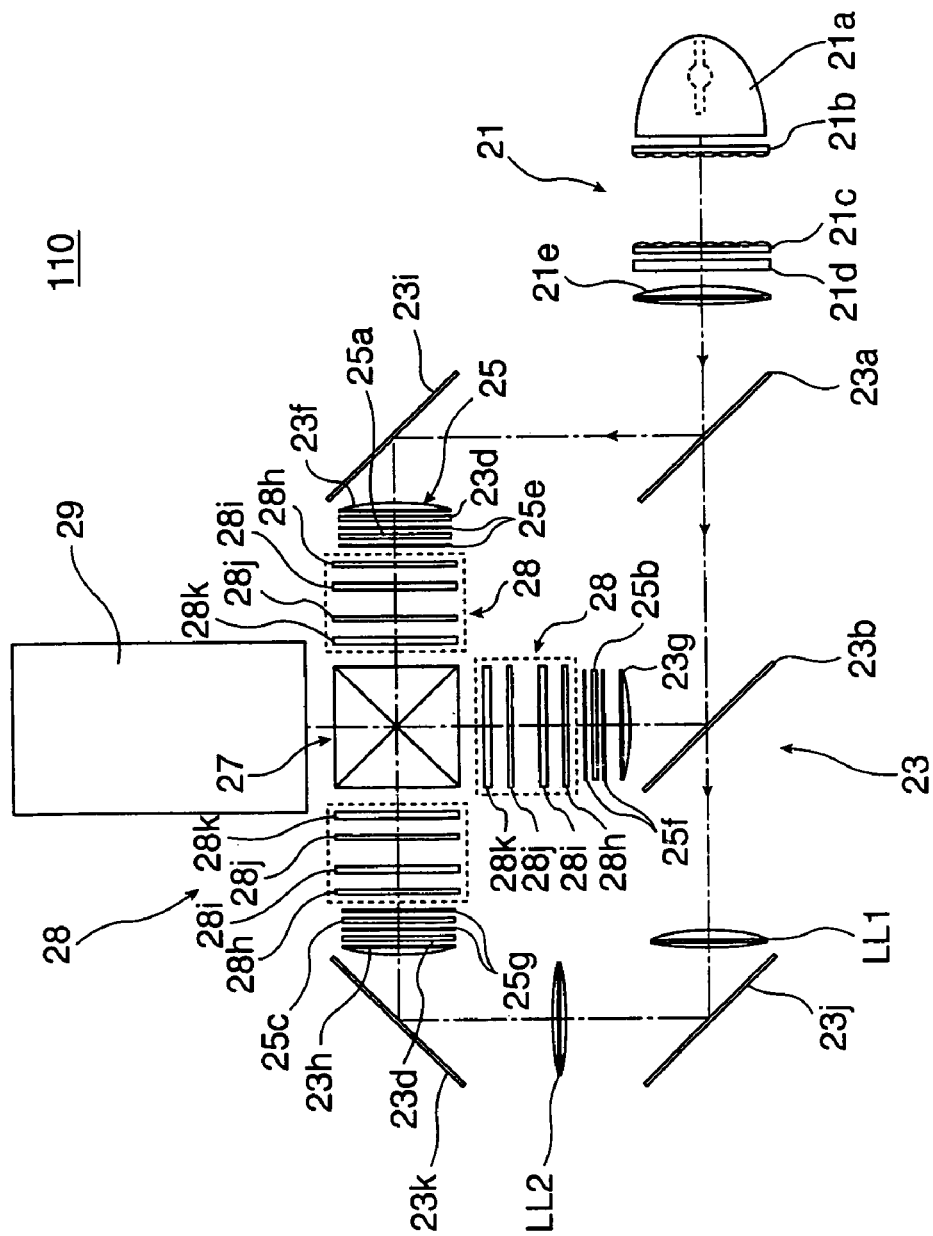
FIG. 11 is a diagram for illustrating the optical system of a projector of a third exemplary embodiment.

FIG. 11 is a diagram for illustrating a projector of a third exemplary embodiment. The projector of the third exemplary embodiment is a modified form of the projector of the first exemplary embodiment. The elements or components not otherwise stated may be configured similarly as with the first exemplary embodiment.

The projector 110 includes BM removing units 28 one for each color of R, G, and B at the previous stage of the cross dichroic prism 27. Such a configuration enables the independent elimination of the black matrix area BA for each color of R, G, and B. In other words, the ratio of split lights can be adjusted for each color of R, G, and B, and the shift amount of the split light can be adjusted for each color of R, G, and B. This enables various expression allowing for color characteristics. Incidentally, although not shown in the diagram, the actuators 28d to 28f (see, FIG. 1) for driving the birefringent plates 28i and 28k, and the λ/2 phase plates 28h and 28j, and the like are provided for the corresponding respective BM removing units 28. Whereas, the source light extracted from the light source unit 21 is set to be an S-polarized light perpendicular to the paper plane.

In addition, the λ/2 phase plate 23d for R light is placed between the field lens 23f and the liquid crystal light valve 25a. Whereas, the λ/2 phase plate 23d for B light is placed between the field lens 23h and the liquid crystal light valve 25c. As a result of this, even when the edge wavelengths in the transmission characteristics of both the dielectric multilayer films 27a and 27b are different for the S-polarized light and the P-polarized light, it is possible to enhance the transmission efficiency of G light by both the dielectric multilayer films 27a and 27b, while enhancing the reflection efficiency of R light and B light by both the dielectric multilayer films 27a and 27b.

Incidentally, when the BM removing units 28 are respectively provided at 3 sites at the previous stage of the cross dichroic prism 27, the case may also occur where the intensity ratio of the original image and the pixel shift image does not become 1:1 in the projected image due to the polarization dependence of the transmission reflection characteristics of both the dielectric multilayer films 27a and 27b provided in the cross dichroic prism 27 even if light has been split into a P-polarized light and an S-polarized light in a splitting intensity ratio of 1:1 in each BM removing unit 28. In this case, the angles of the pairs of the λ/2 phase plates 28h and 28j respectively provided in the three BM removing units 28 are finely adjusted for their corresponding colors. As a result, it is possible to correct the pixel separation of the image to be finally projected while keeping the balance between the respective colors, and to control it to a desired state.

Up to this point, a description was given to the case where the intensity ratio between the original image and the pixel shift image is 1:1. However, the same circumstances also hold for the case where the intensity ratio between the original image and the pixel shift image has been adjusted to the ratio different from 1:1. The changes in angle adjustment amount of the λ/2 phase plates 28h and 28j when the intensity ratio between the original image and the pixel shift image has been thus changed can be stored in, for example, the control unit 50 (see, FIG. 1), as a table, to which reference is made for the driving of the actuators 28d to 28f (see, FIG. 1).

Incidentally, it should be understood that this invention is not limited to the foregoing examples and embodiments, but may be otherwise variously embodied without departing from the spirit and scope thereof. For example, the following modifications may also be made.

In the first to third exemplary embodiments, the BM removing unit 28 is composed of the first and second units 28a and 28b, so that a kind of optical low-pass filtering processing is carried out in orthogonal directions, thereby to remove the black matrix along the two directions. However, it is also possible to remove the black matrix by a BM removing unit composed of only the first unit 28a or the second unit 28b. In this case, for example, the black matrix is removed only along the longitudinal direction or the transverse direction.

It is also possible to change the order of the first and second units 28a and 28b constituting the BM removing unit 28. It is possible to, first, carry out light splitting for removing the black matrix along the transverse direction, and to, then, carry out light splitting for removing the black matrix along the longitudinal direction.

In the foregoing exemplary embodiments, the λ/2 phase plates 28h and 28j are incorporated as polarization state adjusting members in the removing unit 28. However, it is possible to use λ/4 phase plates, or the like in place of the λ/2 phase plates 28h and 28j. Also in this case, by rotating the reference direction of the λ/4 phase plate, or the like about the optical axis of the projector, it is possible to adjust the ratio of light splitting. As the polarization state adjusting member, a Faraday rotator can also be used in place of the phase plate.

In the foregoing embodiments, the two fly-eye optical systems 21b and 21c were used for splitting the light from the light source lamp 21a into a plurality of partial luminous fluxes. However, this invention is also applicable to a projector not using such a fly-eye optical system, i.e., a lens array.

In the foregoing exemplary embodiments, a description was given to the examples of the projector using three liquid crystal light valves. However, this invention is also applicable to a projector using one, two, or four or more light modulating units such as liquid crystal light valves. For example, also when a color display panel of such a type that R, G, and B filters are arranged on respective pixels such as a single liquid crystal light valve is illuminated with a white light source, the same pixel shift (i.e., black matrix elimination processing) is possible using the BM removing unit 28 shown in FIG. 4A, or the like.

In the foregoing exemplary embodiments, a description was given to the case where this invention was applied to a transmission type projector. However, this invention is also applicable to a reflection type projector. Herein, the term transmission type denotes that the light valve such as the liquid crystal light valve is of a light-transmitting type. Whereas, the term reflection type denotes that the light valve is of a light-reflecting type. For the reflection type projector, the light valve can be composed of only a liquid crystal panel, and a pair of polarizing plates are unnecessary. Whereas, for the reflection type projector, the cross dichroic prism may be utilized as a color light separating means for separating a white light into lights of 3 colors of red, green, and blue, and may also be used as a color light synthesizing means for synthesizing the modulated three color lights again, and emitting the synthesized light in the same direction. Alternatively, not the cross dichroic prism, but a dichroic prism composed of a combination of a plurality of dichroic prisms in the forms of a triangle pole and a square pole may also be used. Also when this invention has been applied to the reflection type projector, it is possible to obtain the same effects as with the transmission type projector. Incidentally, the light modulating unit is not limited to the liquid crystal light valve, and it may also be, for example, a light modulating unit using a micromirror.

The projectors include a front projector for carrying out image projection from the direction in which the projected surface is observed; and a rear projector for carrying out image projection from the side opposite to the direction in which the projected surface is observed. The constitution of each of the foregoing examples is applicable to any of the types.

In this invention, any black matrixes of the light modulating unit are acceptable so long as they restrict the emission of an image light by the periodic partial region. They are not limited to the ones formed of a light-shielding film as described in the embodiments. For example, such a light modulating unit as to cause seams between pixels of the projected image corresponds to the light modulating unit having a black matrix even when it does not positively restrict the emission of the image light by a light-shielding film or the like, as with the light modulating unit using a micromirror.

The invention claimed is:

1. A projector, comprising:
  a projection optical system that images an image light from a display unit;
  a birefringent light splitting element that is arranged with a reference direction set to a prescribed direction with respect to a center axis of incident luminous flux; and
  a polarization state adjusting member that adjusts a polarization state of the image light to be made incident upon the birefringent light splitting element as to a distribution between a first component in the prescribed direction and a second component in a direction orthogonal to the prescribed direction, so that the intensity ratio of the first and the second components is arbitrarily set within a range of 0 to 0.5.

2. The projector according to claim 1, the polarization state adjusting member including at least one of a wave plate and an optically rotating element.

3. The projector according to claim 2, the polarization state adjusting member having a wave plate, and adjusting the polarization state of the image light by rotating the reference direction of the wave plate about the center axis.

4. The projector according to claim 1, the display unit being a light modulating unit that is illuminated by an illumination light from an illumination unit, the light modulating unit having a black matrix portion that restricts the emission of the image light by a periodic partial region, and the birefringent light splitting element being a birefringent plate having a thickness corresponding to an arrangement and shape of the black matrix portion along the direction of the central axis.

5. The projector according to claim 1, the polarization state adjusting member being capable of changing the polarization state of the image light that is incident upon the birefringent light splitting element, and thereby changing an intensity ratio in which the image light is split by the birefringent light splitting element.

6. The projector according to claim 5, further comprising:
  a control device that drives the polarization state adjusting member, and thereby changing the intensity ratio in which the image light is split by the birefringent light splitting element.

7. The projector according to claim 1, further comprising:
  a second birefringent light splitting element arranged on a front side of the birefringent light splitting element with the reference direction set to the direction orthogonal about the optical axis to the prescribed direction; and
  a second polarization state adjusting member that adjust the polarization state of the image light that is incident on the second birefringent light splitting element so as to distribute the image light between a component in the prescribed direction and a component in the orthogonal direction.

8. The projector according to claim 1, the display unit including a plurality of light modulating units provided one for each color, and to be individually illuminated, and further comprising:
  a light synthesizing member that synthesizes and emits the lights modulated by the light modulating units.

9. The projector according to claim 8, the polarization state adjusting member and the birefringent light splitting element being sequentially arranged along the optical path on the front side of the light synthesizing member.

10. The projector according to claim 8, the polarization state adjusting members and the birefringent light splitting elements being respectively sequentially arranged along the optical paths for respective colors on the front side of the plurality of the light modulating units and on a rear side of the light synthesizing member.

11. The projector according to claim 7, the display unit including a plurality of light modulating units provided one for each color, and to be individually illuminated, and further comprising:

a light synthesizing member that synthesizes and emits the lights modulated by the light modulating units.

12. The projector according to claim 11, the polarization state adjusting member and the birefringent light splitting element being sequentially arranged along the optical path on the front side of the light synthesizing member.

13. The projector according to claim 11, the polarization state adjusting members and the birefringent light splitting elements being respectively sequentially arranged along the optical paths for respective colors on the front side of the plurality of the light modulating units and on a rear side of the light synthesizing member.

* * * * *